United States Patent
Dimitri et al.

(10) Patent No.: US 6,865,640 B2
(45) Date of Patent: Mar. 8, 2005

(54) HARD DISK DRIVE LIBRARY

(75) Inventors: Kamal Emile Dimitri, Tucson, AZ (US); John Edward Kulakowski, Tucson, AZ (US); Rodney Means, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 669 days.

(21) Appl. No.: 09/843,387

(22) Filed: Apr. 26, 2001

(65) Prior Publication Data

US 2002/0162034 A1 Oct. 31, 2002

(51) Int. Cl.$^7$ .............................................. G06F 12/00
(52) U.S. Cl. ...................................... 711/100; 713/340
(58) Field of Search .............................. 713/340, 300, 713/324, 323; 711/100, 111, 112, 114, 154, 170; 369/24.1, 30.33, 30.36, 30.39

(56) References Cited

U.S. PATENT DOCUMENTS

| | | | |
|---|---|---|---|
| 4,987,533 A | 1/1991 | Clark et al. ............... 364/200 |
| 5,197,055 A | 3/1993 | Hartung et al. ............. 369/34 |
| D334,556 S | 4/1993 | Bolden et al. ............. D14/109 |
| D334,919 S | 4/1993 | Hammar et al. .......... D14/109 |
| 5,303,214 A | 4/1994 | Kulakowski et al. ........ 369/34 |
| 5,546,557 A | 8/1996 | Allen et al. ............... 395/438 |
| 5,636,750 A | * 6/1997 | Heyl ......................... 211/1.57 |
| 5,664,146 A | 9/1997 | Bolin et al. ............... 711/115 |
| 5,761,503 A | 6/1998 | Fisher ....................... 711/170 |
| 5,793,714 A | 8/1998 | Inoue et al. .................. 369/30 |
| RE36,286 E | 8/1999 | Hartung et al. ............ 395/828 |
| 5,936,918 A | * 8/1999 | Ohba et al. ............. 369/30.31 |
| 5,983,318 A | 11/1999 | Willson et al. ............. 711/113 |
| 6,041,329 A | 3/2000 | Kishi ........................ 707/100 |
| 6,098,146 A | * 8/2000 | Bouvier et al. ............ 711/100 |
| 6,564,290 B1 | * 5/2003 | Lechner ..................... 711/111 |

FOREIGN PATENT DOCUMENTS

EP          000847051    * 6/1998     G11B/7/28

* cited by examiner

*Primary Examiner*—Pierre Bataille
(74) *Attorney, Agent, or Firm*—Dale F. Regelman

(57) ABSTRACT

Applicants' invention includes a hard disk drive library which includes a plurality of hard disk drive storage slots, a plurality of backplane connectors, wherein a backplane is disposed in or adjacent to each of the hard disk drive storage slots. Applicants' hard disk drive library further includes one or a plurality of hard disk drives removably disposed in the plurality of storage slots, and a controller in communication with each hard disk drive removably disposed within the hard disk drive library. Applicants' invention further includes a data storage and retrieval system which includes Applicants' hard disk drive library in combination with one or more external servers.

Applicants' invention further includes a method to insert additional hard disk drives into Applicants' hard disk drive library. Applicants' invention further includes a method to store data in, and to retrieve data from, the hard disk drives removably disposed in Applicants' hard disk drive library.

11 Claims, 10 Drawing Sheets

HARD DISK DRIVE LIBRARY

FIELD OF THE INVENTION

The present invention relates to a data storage and retrieval system comprising a hard disk drive library, a method to removably insert additional hard disk drive units into Applicants' hard disk drive library, and a method to store and retrieve data from Applicants' hard disk drive library.

BACKGROUND OF THE INVENTION

Modem computer systems require large quantities of information storage. To meet this requirement computer data storage is available in many forms. A fast, but expensive, form of data storage is main memory, typically including monolithic semiconductor circuits. Other available forms of data storage include magnetic direct access storage devices, magnetic tape storage devices, and optical recording devices. These types of data storage actually store data on electromagnetic or optical media. Each of these other types of data storage has a greater storage density and lower cost than main memory. However, these other devices require mechanical movement and therefore have slower data access times than purely electronic main memory.

Storing all system data in main memory is costly; however, storing all system data on one or more peripheral storage devices reduces performance. Thus, a typical computer system includes both main memory and one or more data storage devices arranged in a data storage hierarchy. In such a hierarchy, main memory is often referred to as the primary data storage. The next level of the hierarchy is known as the secondary data storage, and so on. Generally, the highest level of the hierarchy has the lowest storage density capability and capacity and highest cost. Down through the hierarchy, storage density and capacity generally increases and associated costs generally decrease. By transferring data between different levels of the hierarchy, as required, cost and performance are optimized.

In order to have the information available on an "as needed" basis, much storage at the lowest level of the hierarchy is required. Business applications typically use numerous portable data storage media including floppy disks, optical disks, or magnetic tapes, to meet the required data storage needs. Prior art data storage libraries have been developed to manage the storage of such portable disks or tapes. Some storage libraries employ automatic means including robotic picker and gripper devices to store and access such portable data storage media. Others do not employ automatic means, but rather rely on human operators to store and access conventional portable data storage media when needed. Those storage libraries relying on human operators are referred to as "manual data storage libraries".

Manual data storage libraries remain popular as a choice over automated libraries because manual libraries do not require as large a capital investment. Also, manual libraries allow a human operator to maintain more control over the library. Prior art manual data storage libraries include a plurality of storage bins or slots for retaining portable data storage media, such as magnetic tapes, magnetic disks, or optical disks. Each portable data storage medium may be contained in a cassette or cartridge housing for protection. An operator must be alerted to transfer a certain portable data storage medium from a storage slots to one of only a few available disk drive units. In this regard, a disk drive unit having a portable data storage medium mounted therein and allocated for use is referred to as "unavailable". Conversely, a disk drive unit without a portable data storage medium mounted therein, or unallocated, is referred to as "available". Once a portable data storage medium is mounted in a drive unit, and the medium is allocated for use, data may be written to or read from that medium for as long as the system requires. Data is stored on a medium in the form of one or more files, each file being a logical data set.

What is required is a cost-efficient manual data storage library which is capable of storing more data therein than can prior art systems. Applicants' invention fulfills this requirement. Applicants' invention includes a data storage and retrieval system comprising a plurality of hard disk drive units removable disposed within a plurality of hard disk drive storage slots. Applicants' invention further includes a method to add additional hard disk drive units to Applicants' hard disk drive library, and a method to store and retrieve data stored on the hard disk drive units removable disposed with Applicants' library.

SUMMARY OF THE INVENTION

Applicants' invention includes a hard disk drive library comprising a power source, a plurality of hard disk drive storage slots, one or more hard disk drives disposed in, i.e. resident in, one or more of the hard disk drive storage slots such that the power source supplies power to each of the resident hard disk drives, and a controller in communication with each of the resident hard disk drives. In another embodiment, Applicant's hard disk drive library includes a plurality of display devices which indicate the status of each hard disk drive storage slot, and of each resident hard disk drive. In certain embodiments, one of these display devices is disposed adjacent each hard disk drive storage slot. In other embodiments, these display devices are located remotely from the hard disk drive storage slots.

Applicant's invention further includes a data storage and retrieval system which includes Applicants' hard disk drive library in combination with one or more external servers. Each external server can read data from, and/or write data to, any of the hard disk drives disposed within Applicants' hard disk drive library.

Applicants' invention further includes a method to insert additional hard disk drives into Applicants' hard disk drive library. Applicants' invention further includes a method to store data in, and/or retrieve data from, the hard disk drives disposed within Applicants' hard disk drive library.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Figure 1:
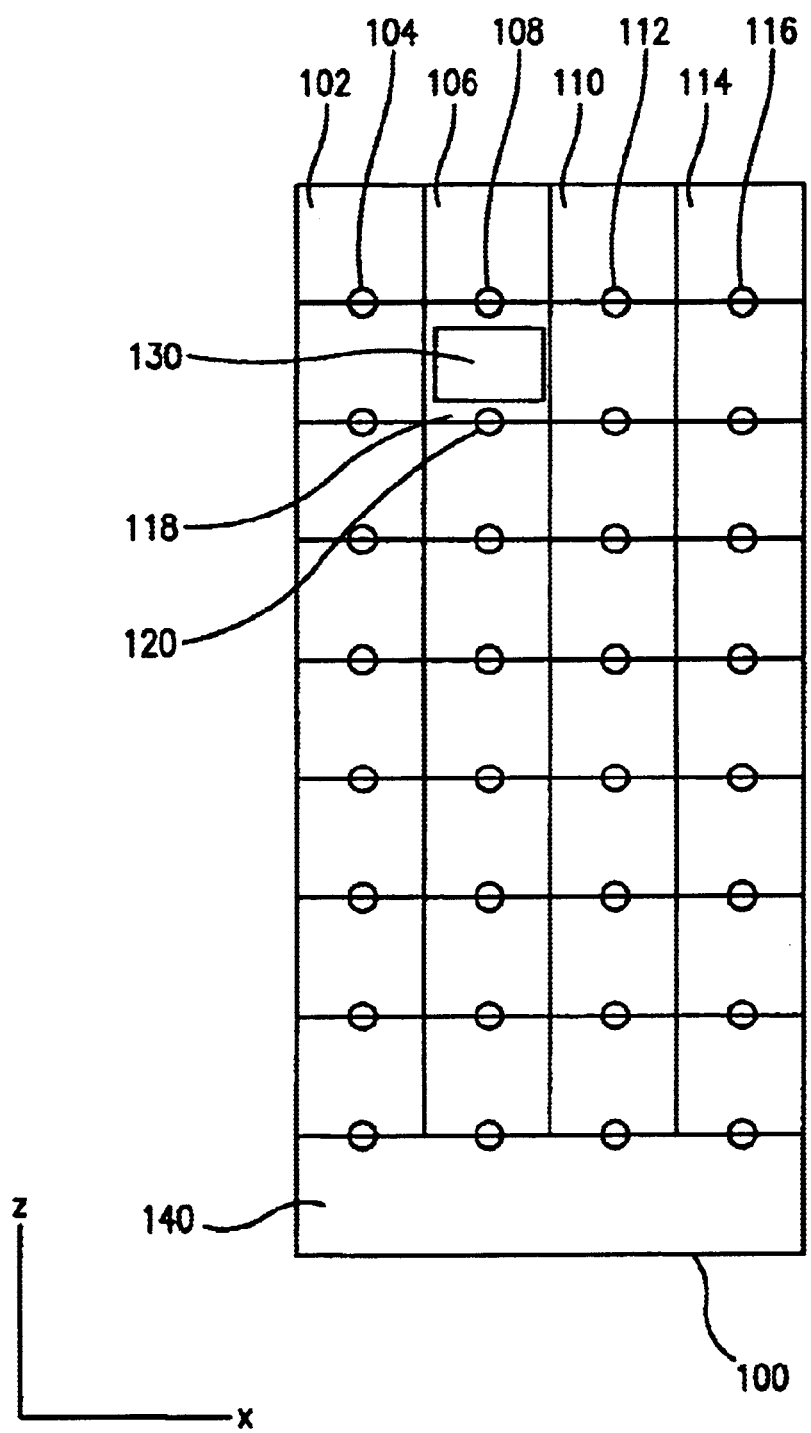
FIG. 1 is a side view of a first preferred embodiment of Applicants' hard disk drive library.

Turning to FIG. 1, Applicants' hard disk drive library 100 is shown comprising a plurality of storage slots, including storage slots 102, 106, 110, 114, and 118. The embodiment of Applicants' hard disk drive library shown in FIG. 1 includes 32 separate storage slots. In other embodiments of Applicants' invention, the hard disk drive library includes fewer than 32 storage slots, while in other embodiments, the hard disk drive library includes more than 32 storage slots.

In the embodiment shown in FIG. 1, each storage slot includes a display device which displays status information about that particular storage slot and/or the hard disk drive disposed therein. For example, display device 104 provides information regarding the status of storage slot 102. Display device 108 provides information regarding storage slot 106. Similarly, display devices 112 and 116 display information regarding storage slots 110 and 114, respectively.

In the embodiment shown in FIG. 1, display devices 104, 108, 112, 116, and 118 are disposed beneath their respective storage slots, in other embodiments of Applicants' invention the display devices are disposed above, or to one side, of their respective storage slots. In other embodiments, the display devices are located remotely from their respective storage slots. For example, the display devices for a given hard disk drive library can be disposed on a separate status board located remotely from the actual storage slots.

In addition and in an embodiment not shown in FIG. 1, one or more user-accessible switches are disposed adjacent each drive unit. One such switch is used to manually turn off power to a drive unit not presently in use. That storage slot could be vacant, or could house a hard disk drive not being used. Another such switch is used to power up a storage slot. Once again, this particular storage slot could be vacant or could house a hard disk drive about to be used.

In the embodiment shown in FIG. 1, power source 140 is disposed beneath the plurality of storage slots. In one embodiment, power source 140 provides about +/−12 volts DC to each storage slot disposed in Applicants' hard disk drive library, and about +/−5 volts DC to each display device disposed in Applicants' hard disk drive library. Power source 140 includes a 110 volt AC/220 volts AC, nominal 60 hertz, power supply.

In certain embodiments, Applicants' power source 140 comprises a power supply module which includes two or more power supplies. In certain of these embodiments, the individual power supplies comprising power supply module 140 can utilize an input voltage from about 90 volts to about 250 volts, and an AC input frequency from about 50 hertz to about 75 hertz.

Referring again to FIG. 1, hard disk drive 130 is removably disposed in, i.e. resident in, storage slot 118. Display device 120 indicates the status of hard disk drive 130 and/or storage slot 118. In one embodiment, display device 120 comprises three (3) separate lights. Illumination of a first light component of display device 120 indicates that hard disk drive 130 is in operation. Illumination of a second light component indicates that hard disk drive 130 is to be removed. The third light component of display device 120 is operational only when storage slot 118 is empty. Illumination of this third light indicates that a certain hard disk drive is to be inserted into storage slot 118.

In another embodiment, display device 120 comprises an LED device formed using two (2) light emitting diodes. In this embodiment, device 120 displays a first color when a positive voltage is applied to the LED, a second color when a negative voltage is applied to the LED, and a third color when a pulse width modulated voltage varying between the aforementioned positive voltage and negative voltage is applied to the LED. In this embodiment, for example, a blue color indicates the hard disk drive disposed in storage slot 118 is in operation, a yellow color indicates that hard disk drive 130 is to be removed, and a green color indicates that a certain hard disk drive is to be inserted into storage slot 118.

Figure 2A:
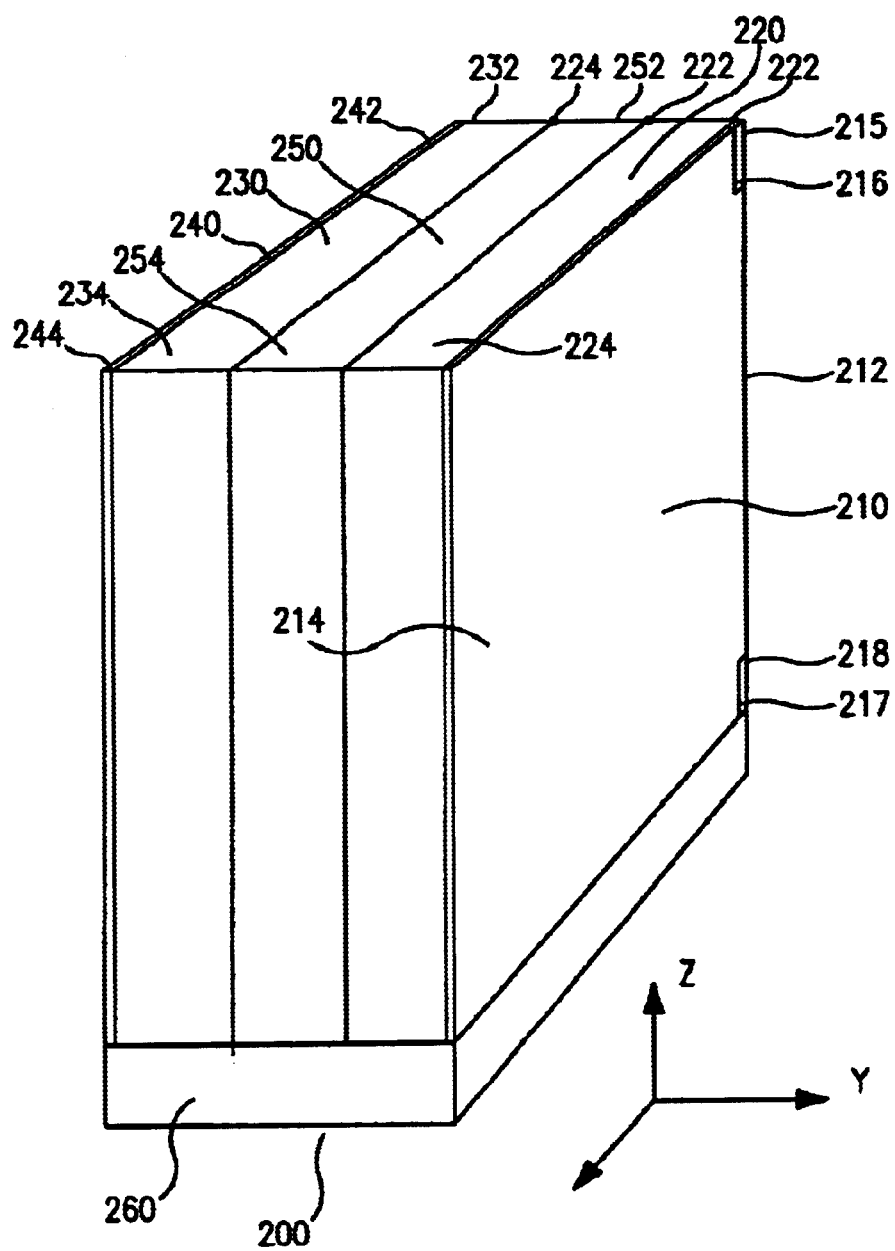
FIG. 2a is a first perspective view of a second preferred embodiment of Applicants' hard disk drive library.

Referring to FIG. 2a, hard disk drive library 200 includes first door 210, first storage wall 220, utilities module 250, second storage wall 230, second door 240, and power supply module 260. First door 210 is pivotably attached to first storage wall 220 by hinges 216 and 218. In the embodiment shown in FIG. 2a, hinge 216 is disposed adjacent top end 215 of rear edge 212 of first door 210. Similarly, hinge 218 is disposed adjacent bottom end 217 of rear edge 212 of first door 210.

First door 210 can be formed from any rigid material, including wood, metal, plastic, and combinations thereof. First door 210 can be optically clear or optically opaque. In optically clear embodiments, first door 210 can be formed from a molded, optically clear plastic, such as polycarbonate. In the alternative, first door 210 can be formed from an optically clear glass.

Second door 240 is pivotably attached to second storage wall 230 by hinges 236 (not shown in FIG. 2a) and 238 (not shown in FIG. 2a). Hinge 236 is disposed adjacent top end 235 (not shown in FIG. 2a) of rear edge 232 (not shown in FIG. 2a) of second door 230. Similarly, hinge 238 (not shown in FIG. 2a) is disposed adjacent bottom end 237 (not shown in FIG. 2a) of rear edge 232 (not shown in FIG. 2a) of second door 230.

Second door 240 can be formed from any rigid material, including wood, metal, plastic, and combinations thereof. Second door 240 can be optically clear or optically opaque. In optically clear embodiments, second door 240 can be formed from a molded, optically clear plastic, such as polycarbonate. In the alternative, second door 240 can be formed from an optically clear glass.

In the embodiment shown in FIG. 2a, first door 210 and second door 230 each pivot outwardly from the same end of hard disk drive library 200. In other embodiments, first door 210 and second door 230 pivot outwardly from differing ends of library 200.

In one embodiment, both first door 210 and second door 240 include locks. When first door 210 and/or second door 240 is locked, a key is required to first unlock the door(s) before the door(s) can be opened to afford access to the hard disk drives resident in Applicants' hard disk drive library. In other embodiments, first door 210 and second door 240 are locked / unlocked by controller 320. In these embodiments, the correct password must be provided controller 320 before first door 210 and/or second door 240 can be opened. In other embodiments, each hard disk drive unit stored in Applicants' hard disk drive storage library is programmed controlled by controller 320. The correct password must be provided controller 320 before data can be written to, or read from, any certain hard disk drive stored in Applicants' hard disk drive storage library.

Figure 2B:
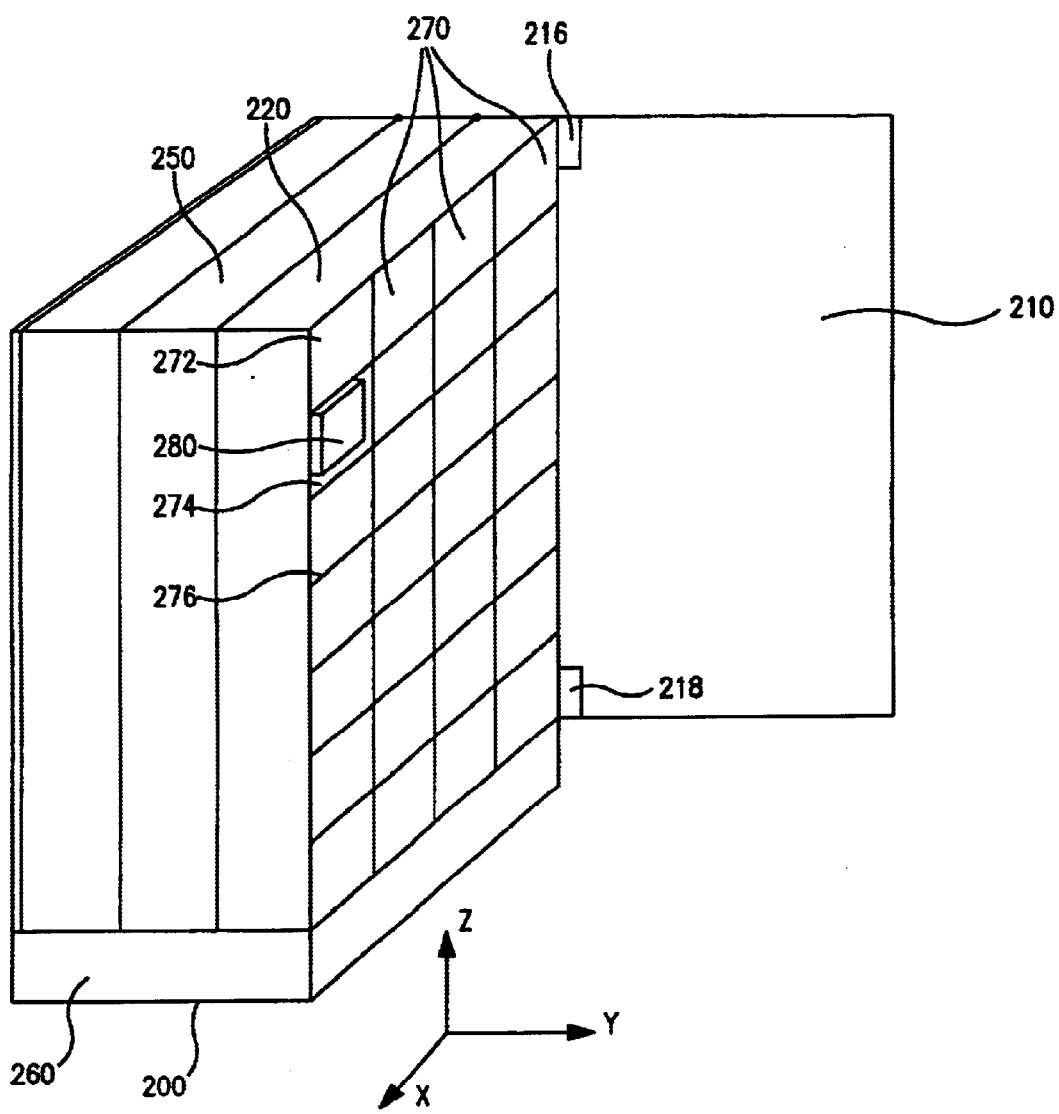
FIG. 2b is a second perspective view of that second preferred embodiment of Applicants' hard disk drive library.

Referring to FIG. 2*b*, first door 210 is shown pivoted outwardly from, and exposing, first storage wall 220. First storage wall 220 includes first plurality of storage slots 270. First plurality of storage slots 270 includes storage slots 272, 274, and 276. Hard disk drive 280 is shown disposed in storage slot 274. Power supply module 260 supplies power to hard disk drive 280 via power cable 282 (not shown in FIG. 2*b*) disposed in utilities module 250.

As those skilled in the art will appreciate, if first door 210 is formed from an optically clear material such as polycarbonate and/or glass, first plurality of storage slots 270 can be seen through first door 210. In this embodiment, display devices showing the status of each storage slot and/or each hard disk drive disposed one of the storage slots can also be seen through first door 210.

Figure 2C:
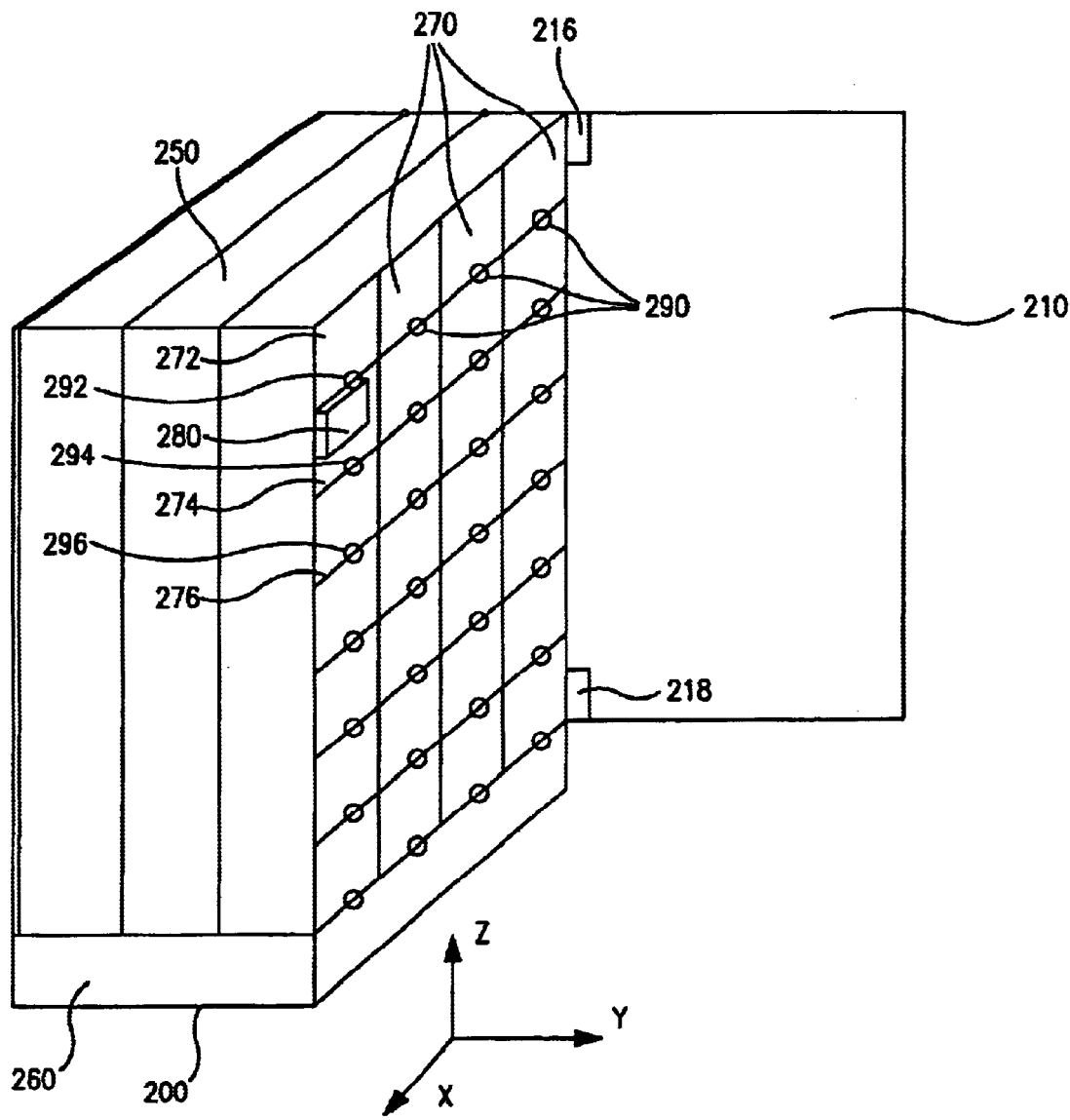
FIG. 2c is a third perspective view of that second preferred embodiment of Applicants hard disk drive library.

The embodiment shown in FIG. 2*c* includes a first plurality of display devices 290, such that each individual display device is disposed beneath one of first plurality of storage slots 270. First plurality of display devices 290 includes display devices 292, 294, and 296. Power supply module 260 supplies power to display devices 292, 294, and 296 via power cables (not shown in FIG. 2*c*) disposed in utilities module 250.

Figure 2D:
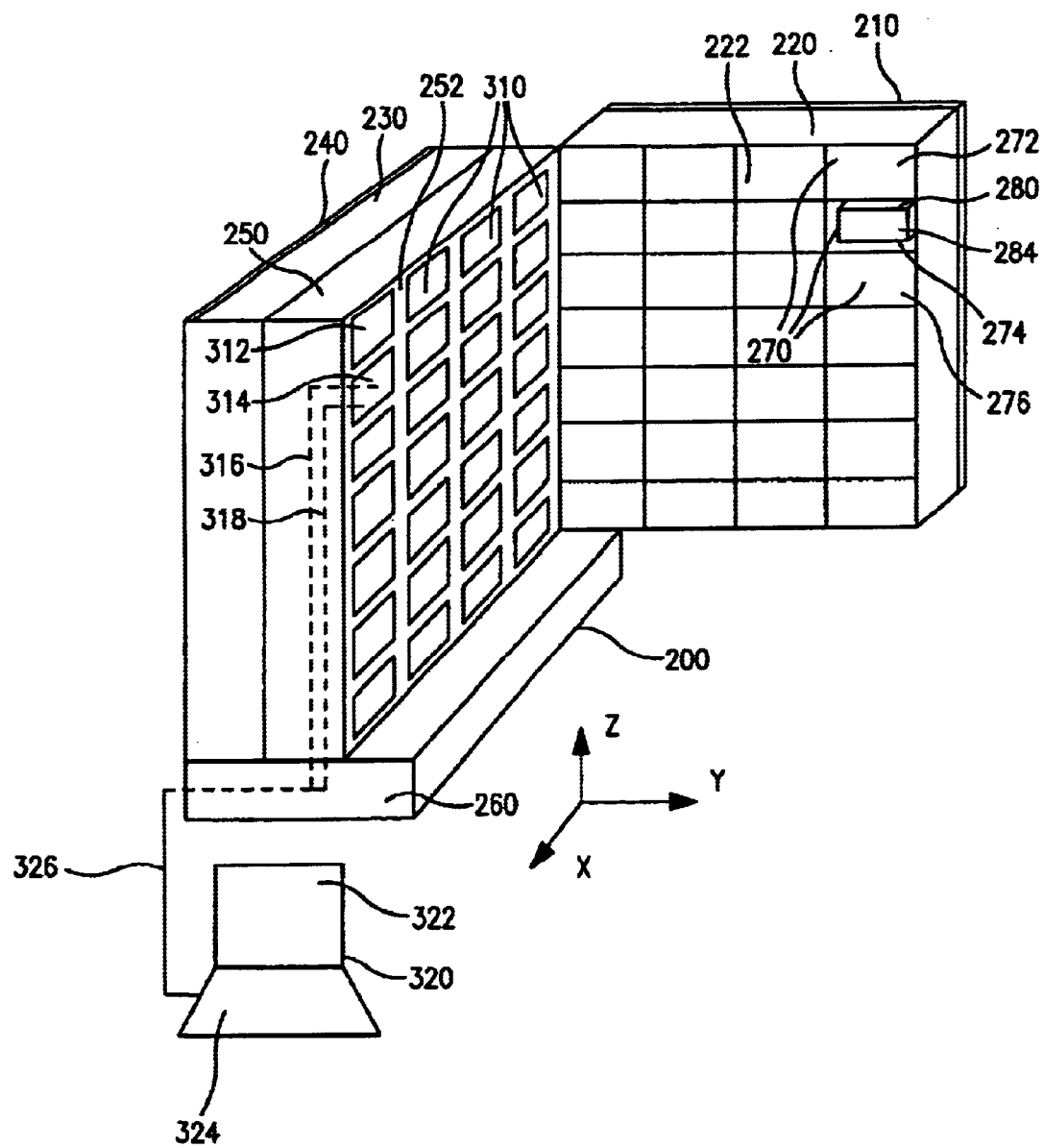
FIG. 2d is a fourth perspective view of that second preferred embodiment of Applicants' hard disk drive library.

Referring to FIG. 2*d*, first door 210 and first storage wall 220 are shown pivoted outwardly to expose first surface 252 of utilities module 250. A first plurality of backplane connectors 310 are disposed on first surface 252. First plurality of backplane connectors 310 includes backplane connectors 312, 314, and 316. FIG. 2*d* shows the rear portion 284 of hard disk drive 280 which is disposed in storage slot 274. When first storage wall 220 is closed such that rear surface 222 of first wall 220 abuts first surface 252 of utilities module 250, rear portion 284 of hard disk drive 280 makes physical and electrical contact with backplane connector 314.

Power bus 318 is internally disposed within central portion 250, and connects backplane connector 314 to power supply module 260. Power bus 318 supplies power to hard disk drive 280. Power bus 318 comprises one or more power cables.

Internal communication link 316 is internally disposed within utilities module 250, and connects backplane connector 314 and controller 320 via external communication link 326. Internal communication link 316 comprises one or more cables. External communication link 326 comprises, for example, an RS 232 cable, a local area network, a private wide area network, or a public wide area network such as the Internet. Controller 320 comprises input device 324 and display device 322. Controller 320 comprises a personal computer, a mainframe computer, a network of mainframe computers, and the like, and combinations thereof. In a preferred embodiment, controller 320 comprises a personal computer.

Controller 320 provides first information, such as control inputs, to hard disk drive 280 via external communication link 326, internal communication link 316, and backplane connector 314. Hard disk drive 280 provides second information, such as drive status and data stored thereon, to controller 320 via backplane connector 314, internal communication link 316, and external communication link 326.

Controller 320 similarly provides first information to each of first plurality of storage slots 270 and to each hard disk drive disposed in any of those storage slots. Controller 320 similarly receives second information from each of first plurality of storage slots 270 and each from each hard disk drive disposed in any of those storage slots.

Controller 320 preferably uses SCSI drive unit commands to turn on power, provide input and/or output commands, place one or more hard disk drives into a sleep mode, and so on. All hard disk drives resident in Applicants' library are spun up or down via command. When access is required to a volser, power is applied and the drive is spun up. Drives which have active data are always spinning. The connection for data and commands via the backplane may be SCSI, IDE, or fibre channel, with appropriate switches.

Second storage wall 230 comprises the same components, and is formed similarly to, first storage wall 250. Second storage wall includes second plurality of hard disk drive storage slots 330 (not shown in FIGS. 2*a*–2*d*). In certain embodiments, second plurality of display devices 340 (not shown in FIGS. 2*a*–2*d*) are disposed on second storage wall 230 adjacent their respective storage slots.

Second surface 254 (not shown in FIGS. 2*a*–2*d*) opposes first surface 252 of utilities module 250. A second plurality of backplane connectors 350 (not shown in FIGS. 2*a*–2*d*) are disposed on second surface 254 in the manner described above. Power supply module 260 provides power to each of second plurality of storage slots 330 and to each of second plurality of display devices 340 via second plurality of backplane connectors 350 in the manner described above.

Controller 320 provides first information, including command instructions, to each of second plurality of storage slots 330 in the manner described above. Controller 320 receives second information from each of second plurality of storage slots 330, and/or the hard disk drives disposed in second plurality of storage slots 330, in the manner described above.

The data path for data written to and/or data read from the hard disk drives stored in hard disk drive library 200 is not shown in FIGS. 2*a* through 2*d*. Each of plurality of hard disk drive storage slots 270/330 is in communication with one or more external servers (not shown in FIGS. 2*a*–2*d*). The communication between each individual hard disk drive storage slot and each hard disk drive disposed within Applicants' hard disk drive storage library is discussed below. In certain embodiments, the control of hard disk drive resources discussed above in conjunction with controller 320 is performed by one or more external servers in communication with controller 320 and/or in communication with first plurality of storage slots 270 and second plurality of storage slots 330.

Figure 4A:
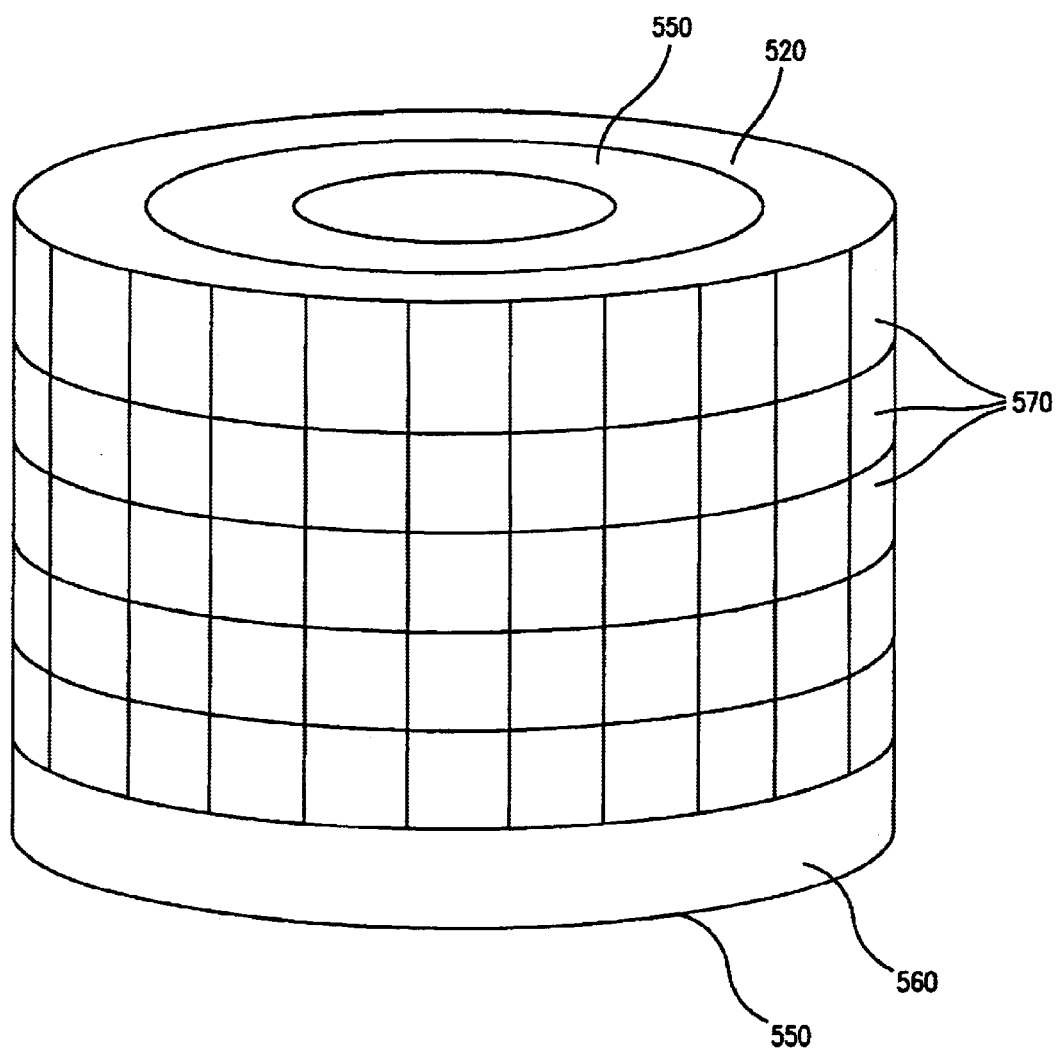
FIG. 4a is a side view of a third preferred embodiment of Applicants' hard disk drive library.

In the embodiment shown in FIGS. 2*a* through 2*d*, first door 210, first storage wall 220, and utilities module 250 are rectangular in shape. FIG. 4*a* shows a side view of hard disk drive library 500. Hard disk drive library 500 is cylindrical in shape, and includes storage wall 520, utilities module 550, and power supply module 560. Hard disk drive library 500 includes a controller 502 (not shown in FIG. 4*a*). Controller 502 communicates with each hard disk drive storage slot, and with each resident hard disk drive in the manner described above.

Certain embodiments of hard disk drive library include a plurality of display devices 504 (not shown in FIG. 4*a*) disposed adjacent each hard disk drive storage slot. This plurality of display devices functions in the manner described above, In other embodiments, hard disk drive library 500 includes a plurality of display devices 506 (not shown in FIG. 4*a*) located remotely from the individual hard disk drive storage slots.

Hard disk drive library 500 includes a plurality of backplane connectors 580 (not shown in FIG. 4*a*). Each of plurality of storage slots 570 includes a backplane connector disposed therein such that upon insertion of a hard disk drive in a storage slot, that inserted hard disk drive makes physical and electrical contact with the backplane connector disposed therein. Power supply module 550 supplies power to each of plurality of backplane connectors 580.

Figure 4B:
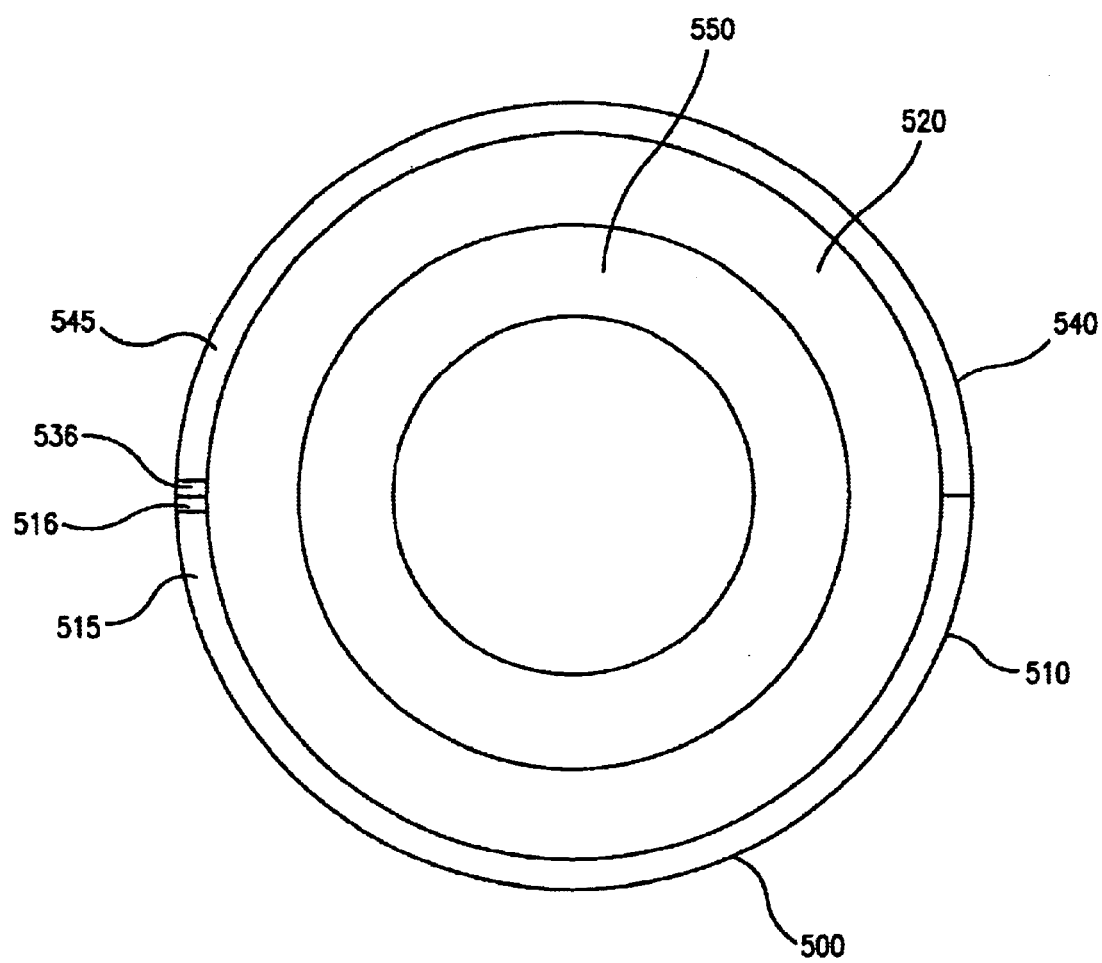
FIG. 4b is a top view of that third preferred embodiment of Applicants' hard disk drive library.

Certain embodiments of hard disk drive library 500 include one or more doors. FIG. 4b shows a top view of an embodiment of Applicants' cylindrical hard disk drive library 500 which includes a first door 510 and a second door 540. First door 510 is semi-circular in shape and pivots outwardly from storage wall 520 using hinge 516 and 518 (not shown in FIG. 4b). Hinge 516 is disposed adjacent top side 515 of first door 610. Hinge 518 is disposed adjacent bottom side 517 (not shown in FIG. 4b) of first door 510.

First door 510 can be formed from any rigid material, including wood, metal, plastic, and combinations thereof. First door 510 can be optically clear or optically opaque. In optically clear embodiments, first door 510 can be formed from a molded, optically clear plastic, such as polycarbonate. In the alternative, first door 510 can be formed from an optically clear glass.

Second door 540 is semi-circular in shape and pivots outwardly from storage wall 520. Second door 540 is pivotably attached to storage wall 520 by hinges 536 and 538 (not shown in FIG. 4b). Hinge 536 is disposed adjacent top side 545 of second door 540. Similarly, hinge 538 (not shown in FIG. 4b) is disposed adjacent bottom end 537 (not shown in FIG. 4b) of second door 540.

Second door 540 can be formed from any rigid material, including wood, metal, plastic, and combinations thereof. Second door 540 can be optically clear or optically opaque. In optically clear embodiments, second door 540 can be formed from a molded, optically clear plastic, such as polycarbonate. In the alternative, second door 540 can be formed from an optically clear glass.

Figure 3:
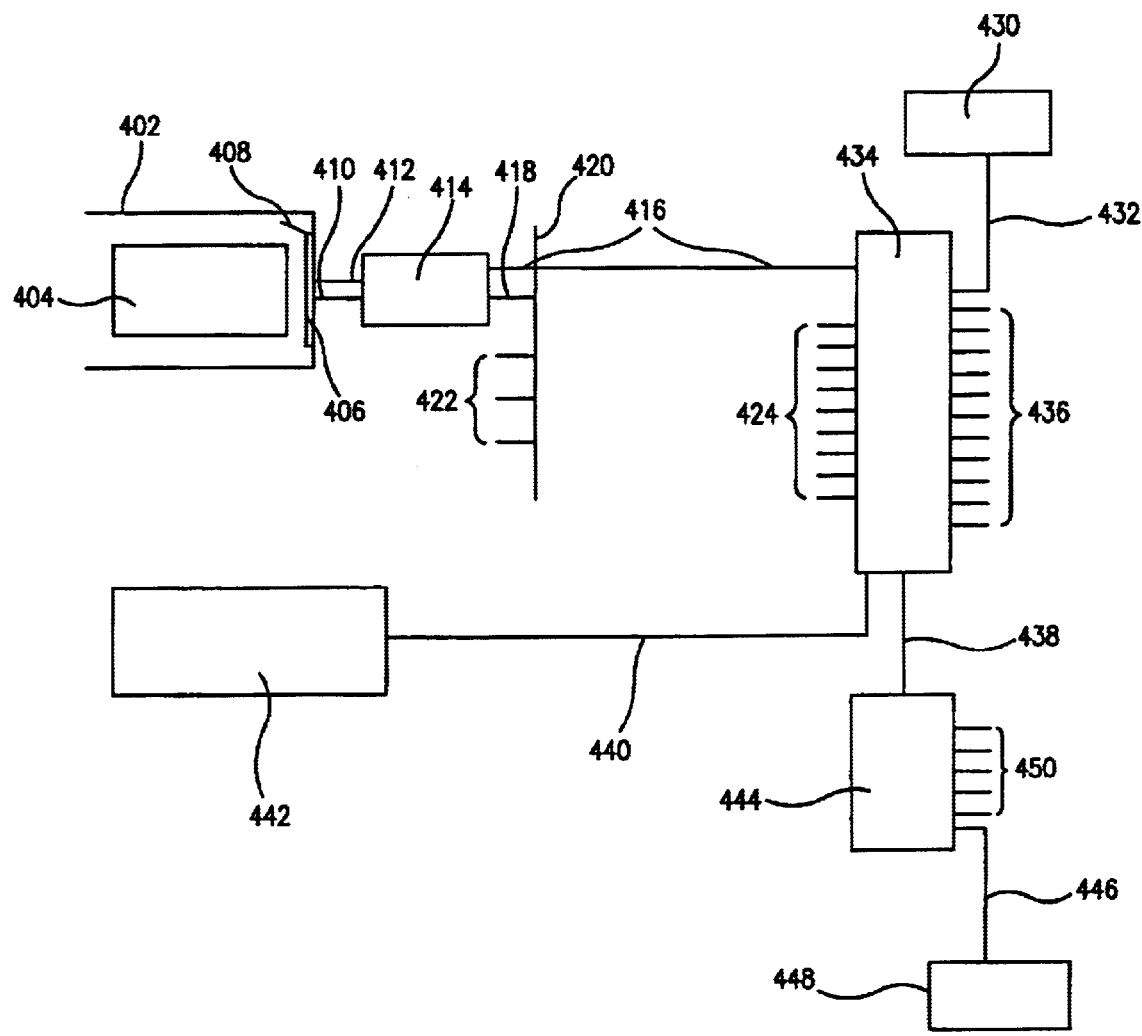
FIG. 3 is a block diagram showing the components of Applicants' hard disk drive library.

Referring to FIG. 3, hard disk 404 is shown disposed in storage slot 402. In this embodiment, backplane 406 is disposed in the rear of storage slot 402. Lever 408 is disposed on one end of backplane 406 and makes a zero-insertion connection/contact between hard disk drive 404 and backplane 406 when hard disk drive 404 is inserted into storage slot 402.

Power is supplied to hard disk drive 404 via power bus 420. Power cable 418 connects read/write encoder 414 with power bus 420. Power cable 412 connects backplane 406 and read/write encoder 414. Backplane 406 provides power to hard disk drive 404 when that hard disk is disposed within storage slot 402.

A plurality of power cables 422 connect to power bus 420, and provide power to a plurality of individual hard disk drive units disposed in a plurality of storage slots disposed within Applicants' hard disk drive library. Each of these individual storage slots include the components and connections described above for storage slot 402.

Read/write encoder/decoder chip 414 is also connected to backplane 406 via communication link 410. Communication link 410 comprises an RS 232 cable, a fibre channel cable, a local area network, a private wide area network, a public wide area network, and the like, and combinations thereof. Communication link 416 connects chip 414 to first switch 434. Communication link 416 comprises an RS 232 cable, a fibre channel cable, a local area network, a private wide area network, a public wide area network, and the like, and combinations thereof. Communication link 432 connects first switch 434 and first external server 430. Communication link 432 comprises an RS 232 cable, a fibre channel cable, a local area network, a private wide area network, a public wide area network, and the like, and combinations thereof. First switch 434 includes a plurality of communication links 436 to connect first switch 434 to a first plurality of external servers.

First switch 434 includes a plurality of communication links 424 which connect a plurality of backplane connectors to first switch 434. Each of the communication links comprising plurality of communication links 424 comprises an RS 232 cable, a fibre channel cable, a local area network, a private wide area network, a public wide area network, and the like, and combinations thereof. Each of these individual hard disk drive storage units include the components / connections described above for storage slot 402.

First switch 434 connects to second switch 444 via communication link 438. Communication link 438 comprises an RS 232 cable, a fibre channel cable, a local area network, a private wide area network, a public wide area network, and the like, and combinations thereof. In the embodiment shown in FIG. 3, second switch 444 connects to second server 448 via communication link 446. Communication link 446 comprises an RS 232 cable, a fibre channel cable, a local area network, a private wide area network, a public wide area network, and the like, and combinations thereof. Second switch includes plurality of communication links 450 to connect second switch 444 to a second plurality of external servers. Each of the communication links comprising plurality of communication links 450 comprises an RS 232 cable, a fibre channel cable, a local area network, a private wide area network, a public wide area network, and the like, and combinations thereof.

FIG. 3 shows external server 430 in communication with first switch 434 and external server 448 in communication with second switch 444, in other embodiments more than one external servers are in communication with first switch 434. In yet other embodiments, more than one external servers are in communication with first switch 434 and more than one external servers are in communication with second switch 444.

Controller 442 is connected to first switch 434 by communication link 440. Communication link 440 comprises an RS 232 cable, a fibre channel cable, a local area network, a private wide area network, a public wide area network, and the like, and combinations thereof. Applicants' invention includes a plurality of display devices disposed adjacent each individual storage slot showing the status of that storage slot and/or the status of the hard disk drives disposed in that storage slots. In other embodiments, the status of each hard disk drive storage slot, and the status of each resident hard disk drive in Applicants' library, is displayed remotely. In those remote display embodiments, controller 442 either comprises a display device or provides status information to a stand-alone display device.

Insertion of hard disk drive 404 into storage slot 402 causes read/write encoder chip 414 to signal external server 430 and external server 448. External server 430 and external server 448 then update their respective inventories of hard disk drives to include hard disk drive 404. External server 430 and/or external server 448 can independently access hard disk drive 404 via chip 414, and can read data from, and/or write data to, hard disk drive 404.

Figure 5:
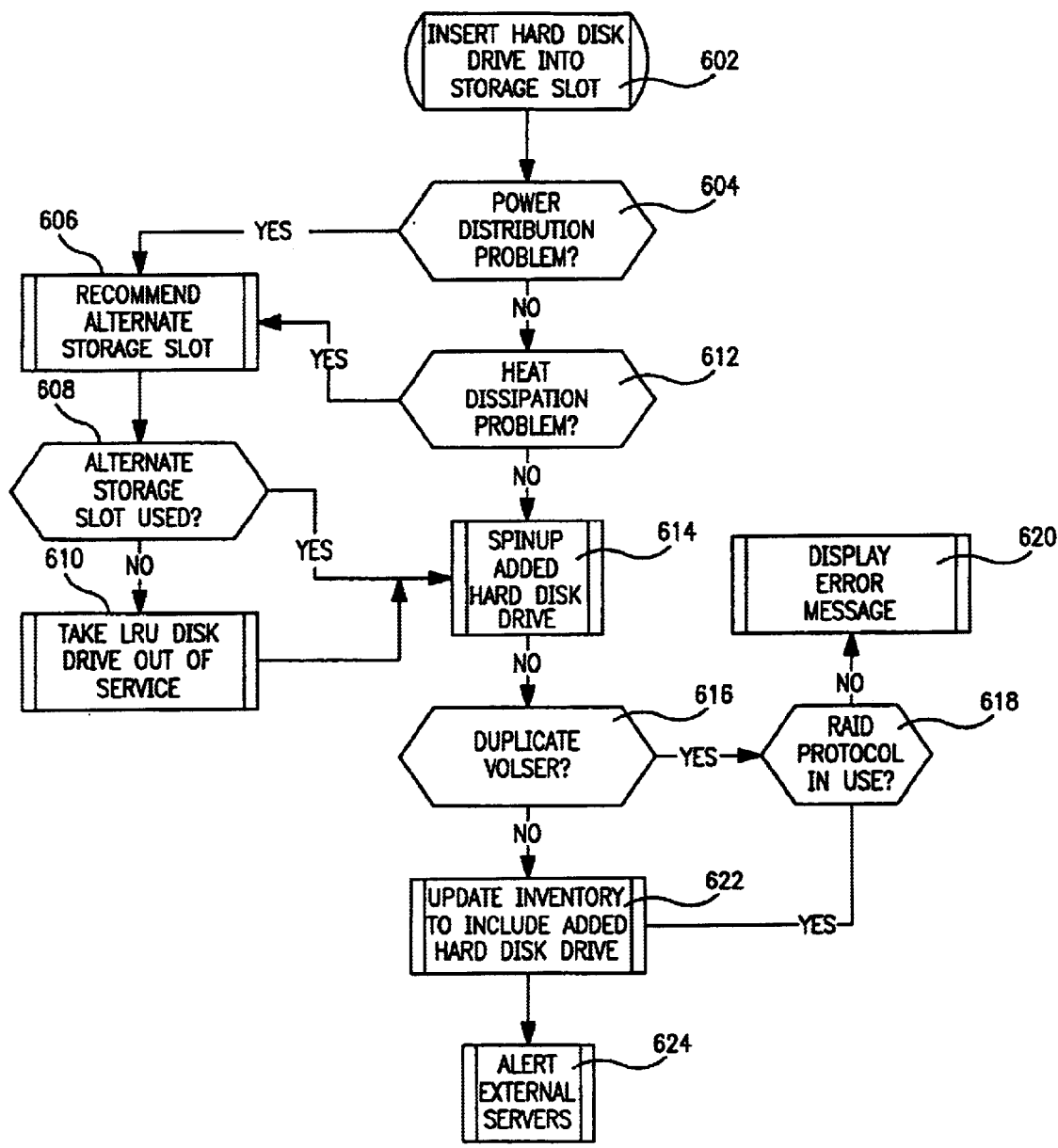
FIG. 5 is a flowchart summarizing a first preferred embodiment of Applicants' method.

Applicants' invention includes a method to store and retrieve data from Applicants' hard disk drive library. FIG. 5 summarizes one embodiment of Applicants' method. In step 602, addition of a hard disk drive to Applicants' hard disk drive library involves manually inserting a hard disk drive into an empty storage slot without prior communication with the library controller. Volume serial numbers serve to identify each hard disk drive resident in Applicants' library. These volume serial numbers are called volsers.

Upon insertion of a hard disk drive unit into the backplane connector disposed in, or adjacent to, the rear portion of a hard disk drive storage slot, the read/write encoder/decoder chip connected to that storage slot provides information to the controller regarding, for example, the location of, and the volser for, the newly-inserted hard disk drive.

Applicants' hard disk drive library includes a computer useable medium having computer readable program code disposed therein for optimizing power distribution within the hard disk drive library. Applicants' computer readable program code comprising a series of computer readable program steps to monitoring the power requirements of the resident hard disk drives disposed within Applicants' hard disk drive library. Applicants' computer readable code further comprises a series of computer readable program steps that, upon a request to add a non-resident hard disk drive to said hard disk drive library, estimate the power requirements of the nonresident hard disk drive, and recommend insertion of the non-resident hard disk drive into a specified hard disk drive storage slot based upon the combined power requirements of the resident hard disk drives and the non-resident hard disk drive to be added.

In step 604, the controller monitors the power used by the resident hard disk drives. The controller then estimates the power requirements of the newly-inserted hard disk drive, and checks the power distribution throughout the library. The controller then determines if the insertion of the added hard disk drive into the chosen storage slot will cause power distribution problems.

Applicants' computer readable program code disposed within Applicants' hard disk drive library further comprises a series of computer readable program steps to monitor the thermal energy generated by the resident hard disk drives disposed within Applicants' hard disk drive library, and to monitor the dissipation of this thermal energy from Applicants' hard disk drive library. Furthermore, Applicants' computer readable program code further comprises a series of computer readable program steps to, upon a request to add a non-resident hard disk drive to Applicants' hard disk drive library, estimate the thermal energy generated by the non-resident hard disk drive, and to recommend insertion of the non-resident hard disk drive into one of the plurality of hard disk drive storage slots in order to optimize the dissipation of the total thermal energy generated by the resident hard disk drives and by the non-resident hard disk drive to be added.

If the controller determines that the placement of the added hard disk drive into the chosen storage slot does not present a power distribution problem, then in step 612 the controller monitors the thermal energy generated by the resident hard disk drives. The controller then estimates the thermal energy likely generated by operation of the added disk drive.

The controller determines if the newly-inserted hard disk drive will cause thermal energy dissipation problems. If the controller determines that placement of the newly-inserted hard disk drive into the chosen storage slot will cause neither power distribution nor thermal energy dissipation problems, then in step 614 the controller places the newly-inserted hard disk drive into operation.

If on the other hand the controller determines that placement of the added hard disk drive into the chosen storage slot is not optimal with respect to either power distribution and/or thermal energy dissipation, in step 606 the controller recommends an alternate location for the newly-added hard disk drive. In one embodiment, the recommended location can be ascertained by visually observing the display devices disposed adjacent each hard disk drive storage slot. In an alternative embodiment, the library controller displays a recommended location on an integral display device. In yet another embodiment, the recommended location is displayed on a status board display which simultaneously displays the status of each storage slot and hard disk drive comprising the library.

In step 608 the controller monitors whether the newly-inserted hard disk drive has been relocated to the recommended storage slot. In the event the newly-inserted hard disk drive has not been removed from its initial storage slot and placed into the recommended storage slot, in step 610 the controller then ascertains the least recently used ("LRU") hard disk drive disposed in the library, and takes that LRU hard disk unit out of service.

Applicants' computer usable medium having computer readable program code disposed therein also creates and maintains a directory for Applicants' hard disk drive library. In this regard, Applicants' computer readable program code further comprises a series of computer readable program steps to read the one or a plurality of resident volsers from the one or a plurality of said resident hard disk drives disposed within Applicants' hard disk drive library, and stores those one or a plurality of resident volsers in the hard disk drive library's directory. Applicants' computer readable program code further comprises a series of computer readable program steps to, upon insertion of a non-resident hard disk drive into one of the plurality of hard disk drive storage slots, read the volser of that non-resident hard disk drive, compare that non-resident volser with the directory; and generate an error message if the non-resident volser matches one or more of the resident volsers recited in the directory, or, add the non-resident volser to the directory if that non-resident volser does not match one or more of the resident volsers.

After optimizing power distribution and thermal energy dissipation, in step 614 the controller then commands the newly-inserted hard disk drive to spinup. Using the volser of the newly-inserted unit, in step 616 the controller checks its inventory of resident hard disk drives to determine if the newly-inserted hard disk drive unit is a duplicate of an existing hard disk drive.

If the controller determines the newly-inserted hard disk drive is not a duplicate, then in step 622 the controller updates its inventory of hard disk drives to include that newly-added hard disk drive. If, however, the controller determines the newly-inserted unit comprises a duplicate of another resident hard disk drive, then in step 618 the controller determines if a Random Array Of Independent Disks, i.e. a "RAID," data storage protocol is being used.

If a RAID protocol is being used, then in step 622 the controller updates its inventory to include the volser of the newly-inserted hard disk drive. If on the other hand, a RAID data storage protocol is not being used, then in step 620 the controller provides an error message and deactivates the newly-added hard disk drive.

After adding the volser of the newly-inserted hard disk drive to its inventory of hard disk drives, the controller in step 624 provides the volser for the newly-inserted hard disk drive to each external server connected to the hard disk drive library. Any of those connected external servers can thereafter read data from, or write data to, the newly-inserted hard disk drive.

Figure 6:
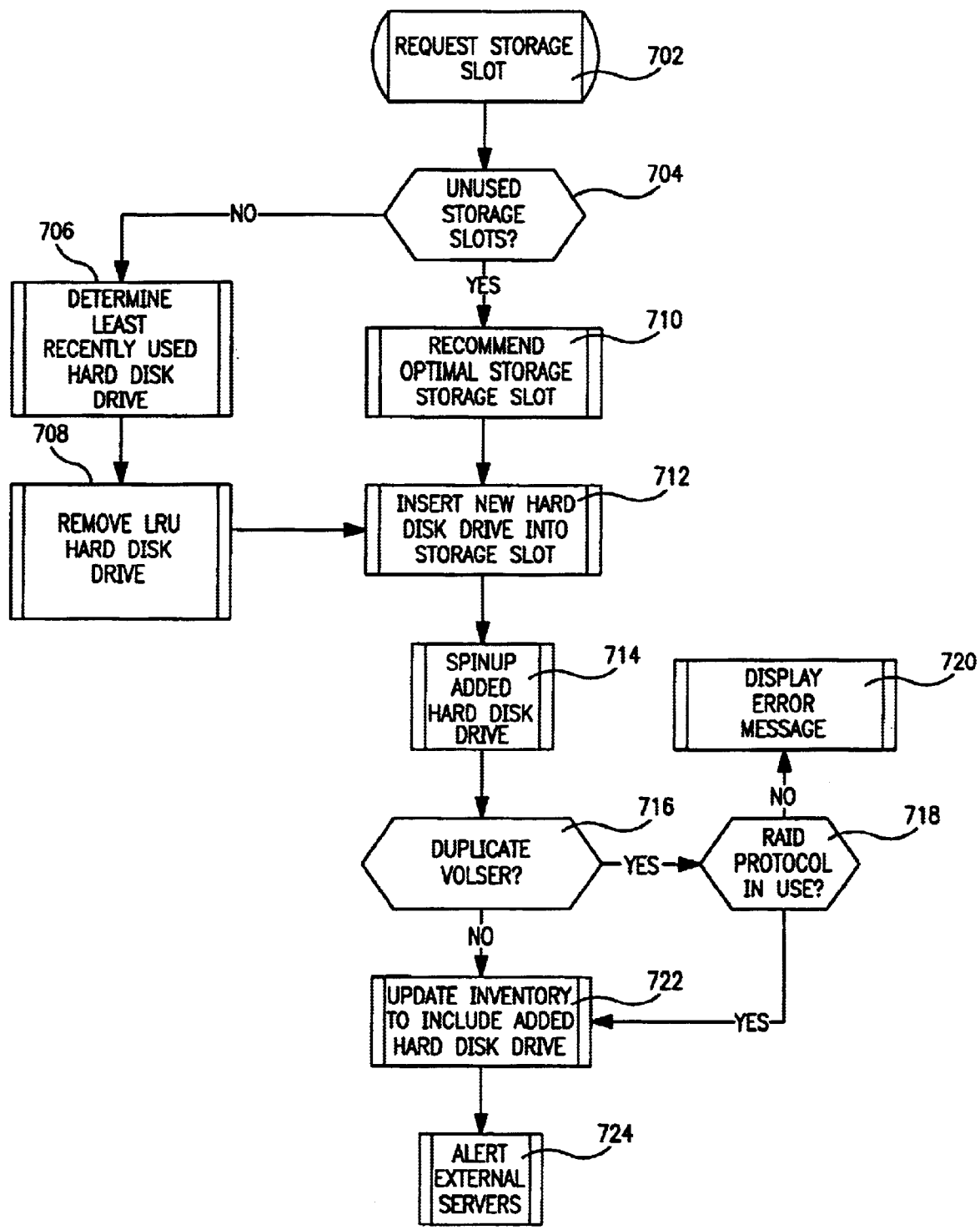
FIG. 6 is a flowchart summarizing a second preferred embodiment of Applicants' method.

Referring to FIG. 6, an alternative embodiment of Applicants' method is shown. In step 702, a user requests the controller recommend an available storage slot. In step 704, the controller determines whether there exists within the hard disk drive library one or more available storage slots. In the event there are available storage slots, in step 710 the controller checks the present power usage throughout the hard disk drive library and the thermal energy generated throughout the hard disk drive library. Based upon that system assessment, the controller determines the optimal storage slot for the additional hard disk drive unit. The controller then displays the location of the recommended storage slot. In one embodiment, the controller illuminates a display device disposed adjacent the recommended storage slot. In other embodiments, the controller displays the location of the recommended storage slot on a remote display device.

In the event a user requests a storage slot for insertion of an additional hard disk drive and there are no available storage slots, then in step 706 the controller ascertains the LRU. In step 708, the controller takes that LRU device out of service, i.e. causes that disk to spindown, and interrupts providing power to the storage slot containing that LRU device. The controller then provides a visual or audible message to remove the LRU device and insert the additional hard disk drive unit in that now-empty storage slot.

Using the volser of the newly-inserted unit, in step 716 the controller checks its inventory of resident hard disk drives to determine if the newly-inserted hard disk drive unit is a duplicate of an existing hard disk drive. If the controller determines the newly-inserted hard disk drive is not a duplicate, then in step 722 the controller updates its inventory of hard disk drives to include that newly-added hard disk drive. If, however, the controller determines the newly-inserted unit comprises a duplicate of another resident hard disk drive, then in step 718 the controller determines if a Random Array Of Independent Disks, i.e. a "RAID," data storage protocol is being used.

If a RAID protocol is being used, then in step 722 the controller updates its inventory to include the volser of the newly-inserted hard disk drive. If on the other hand, a RAID data storage protocol is not being used, then in step 720 the controller provides an error message and deactivates the newly-added hard disk drive.

After adding the volser of the newly-inserted hard disk drive to its inventory of hard disk drives, the controller in step 724 provides the volser for the newly-inserted hard disk drive to each external server connected to the hard disk drive library. Any of those connected external servers can thereafter read data from, or write data to, the newly-inserted hard disk drive.

While the preferred embodiments of the present invention have been illustrated in detail, it should be apparent that modifications and adaptations to those embodiments may occur to one skilled in the art without departing from the scope of the present invention as set forth in the following claims.

We claim:

1. A data storage and retrieval system, comprising:
   a first plurality of hard disk drive storage slots;
   a first plurality of backplane connectors;
   a first plurality of hard disk drives removably disposed within said first plurality of hard disk drive storage slots, such that each of said first plurality of hard disk drives is in electrical contact with one of said first plurality of backplane connectors;
   a first switch;
   a first plurality of read/write encoders;
   a first plurality of communication links, wherein one of said first plurality of communication links connects one of said first plurality of backplane connectors with one of said first plurality of read/write encoders;
   a second plurality of communication links, wherein one of said second plurality of communication links connects one of said first plurality of read/write encoders to said first switch;
   a controller, wherein said controller is connected to said switch by a third communication link; and
   one or a plurality of first external servers;
   one or a plurality of fourth communication links, wherein one of said one or a plurality of fourth communication links connects each of said one or a plurality of first external servers to said first switch.

2. The data storage and retrieval system of claim 1, further comprising:
   a second switch;
   a second plurality of read/write encoders;
   a fifth plurality of communication links, wherein one of said fifth plurality of communication links connects one of said first plurality of backplane connectors with one of said second plurality of read/write encoders;
   a sixth plurality of communication links, wherein one of said sixth plurality of communication links connects one of said second plurality of read/write encoders to said second switch;
   one or a plurality of second external servers;
   one or a plurality of seventh communication links, wherein one of said one or a plurality of seventh communication links connects each of said one or a plurality of second external servers to said second switch.

3. A hard disk drive library, comprising:
   a first plurality of hard disk drive storage slots;
   a first plurality of backplane connectors;
   a first plurality of hard disk drives removably disposed within said first plurality of hard disk drive storage slots, wherein each of said first plurality of hard disk drives is in physical and electrical contact with one of said first plurality of backplane connectors;
   a power source which supplies power to each of said first plurality of backplane connectors;
   a controller, wherein said controller provides first information to each of said first plurality of hard disk drives;
   a first plurality of display devices, wherein each of said first plurality of display devices is connected to said power source, and wherein each of said first plurality of display devices is disposed adjacent one of said plurality of hard disk drive storage slots;
   a display apparatus, wherein said display apparatus displays the status of each of said plurality of hard disk drive storage slots, and wherein said display apparatus displays the status of each hard disk drive disposed within said hard disk drive library;
   a first storage wall having a front and a back, a top and a bottom, and a first side and an opposing second side, wherein said first plurality of storage slots is disposed within said first storage wall;
   a utilities module having a front and a back, a top and a bottom, and a first side and an opposing second side, wherein said back of said first storage wall is disposed adjacent said front of said utilities module; and wherein each of said first plurality of backplane connectors is disposed on said front of said utilities module;

wherein said power supply module is disposed adjacent said bottom of said first structure and adjacent said bottom of said utilities module.

4. The hard disk drive library of claim 3, wherein said first storage wall is pivotably disposed on said utilities module.

5. The hard disk drive library of claim 4, wherein said first storage wall, said utilities module, and said power source are rectangular in shape.

6. The hard disk drive library of claim 5, further comprising a first door pivotably disposed on said front of said front of said first storage wall.

7. The hard disk drive library of claim 4, wherein said first storage wall, said utilities module, and said power source are cylindrical in shape.

8. The hard disk drive library of claim 7, further comprising a first door pivotably disposed on said front of said first storage wall and a second door pivotably disposed on said front of said first storage wall.

9. The hard disk drive library of claim 3, further comprising:

a second plurality of hard disk drive storage slots;

a second plurality of backplane connectors disposed on said rear of said utilities module;

a second storage wall having a front and a back, a top and a bottom, and a first side and an opposing second side, wherein said second plurality of hard disk drive storage slots is disposed within said second storage wall, and wherein said back of said second storage wall is disposed adjacent said back of said utilities module; and a second plurality of hard disk drives removably disposed within said second plurality of hard disk drive storage slots, such that each of said second plurality of hard disk drives is in physical and electrical contact with one of said second plurality of backplane connectors.

10. The hard disk drive library of claim 9, wherein said second storage wall is pivotably disposed on back of said utilities module.

11. The hard disk drive library of claim 9, comprising a second door pivotably disposed on said front of said second storage wall.

* * * * *